(12) United States Patent
Fujita et al.

(10) Patent No.: US 12,422,926 B2
(45) Date of Patent: Sep. 23, 2025

(54) INFORMATION PROCESSING DEVICE AND CONTROL METHOD FOR TO REDUCING INCONVENIENCES WHEN A USER HOLDS A DISPLAY DEVICE

(71) Applicant: CANON KABUSHIKI KAISHA, Tokyo (JP)

(72) Inventors: Shunji Fujita, Kanagawa (JP); Kenichiro Tomita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/677,566

(22) Filed: May 29, 2024

(65) Prior Publication Data
US 2024/0402805 A1    Dec. 5, 2024

(30) Foreign Application Priority Data

May 30, 2023  (JP) ................................. 2023-088523

(51) Int. Cl.
*G06F 3/01*     (2006.01)
*G06F 3/0346*   (2013.01)

(52) U.S. Cl.
CPC ............ *G06F 3/014* (2013.01); *G06F 3/0346* (2013.01); *G06F 3/016* (2013.01); *G06F 2203/0331* (2013.01)

(58) Field of Classification Search
CPC ........ G06F 3/014; G06F 3/0346; G06F 3/016; G06F 2203/0331
See application file for complete search history.

(56) References Cited

U.S. PATENT DOCUMENTS

| 9,582,076 | B2 * | 2/2017 | Kienzle | ................... | G06F 3/017 |
| 11,188,160 | B1 * | 11/2021 | Liu | ......................... | G06F 3/017 |
| 2015/0133193 | A1 * | 5/2015 | Stotler | ............... | G06F 15/0216 |
| | | | | | 455/557 |
| 2016/0306434 | A1 * | 10/2016 | Ferrin | ................... | G06F 1/1694 |
| 2022/0233142 | A1 * | 7/2022 | Hasan | .................... | A61B 5/681 |

FOREIGN PATENT DOCUMENTS

| JP | 2000200133 | A | * | 7/2000 | | |
| WO | WO-2017160456 | A1 | * | 9/2017 | ........... | G06F 1/1626 |

* cited by examiner

*Primary Examiner* — David D Davis
(74) *Attorney, Agent, or Firm* — Canon U.S.A., Inc. IP Division (57) ABSTRACT

An information processing device connected to or integrated into a display device configured to receive an input via a controller includes a control unit configured to control, in a case where a user holds the display device with a user's hand wearing the controller, the display device not to receive the input via the controller, or not to execute any processing upon reception of the input via the controller.

16 Claims, 7 Drawing Sheets

| | (EVENT 411) HOLDING HHD WITH RIGHT HAND | (EVENT 412) NOT HOLDING HHD WITH RIGHT HAND | (EVENT 413) HOLDING HHD WITH LEFT HAND | (EVENT 414) NOT HOLDING HHD WITH LEFT HAND |
|---|---|---|---|---|
| (STATE 401) DISABLE RIGHT-HAND CONTROLLER ENABLE LEFT-HAND CONTROLLER | — | N/A (NOT IN USE) | TRANSITION TO STATE 403 | — |
| (STATE 402) ENABLE RIGHT-HAND CONTROLLER DISABLE LEFT-HAND CONTROLLER | TRANSITION TO STATE 403 | — | — | N/A (NOT IN USE) |
| (STATE 403) DISABLE RIGHT-HAND CONTROLLER AND LEFT-HAND CONTROLLER | — | TRANSITION TO STATE 402 | — | TRANSITION TO STATE 401 |

|  | (EVENT 611) HOLDING HHD WITH RIGHT HAND | (EVENT 612) NOT HOLDING HHD WITH RIGHT HAND |
|---|---|---|
| (STATE 601) DISABLE RIGHT-HAND CONTROLLER | — | TRANSITION TO STATE 602 |
| (STATE 602) ENABLE RIGHT-HAND CONTROLLER | TRANSITION TO STATE 601 | — |

FIG.7

| | (EVENT 711) HOLDING HMD WITH RIGHT HAND | (EVENT 712) NOT HOLDING HMD WITH RIGHT HAND | (EVENT 713) HOLDING HMD WITH LEFT HAND | (EVENT 714) NOT HOLDING HMD WITH LEFT HAND |
|---|---|---|---|---|
| (STATE 701) DISABLE RIGHT-HAND CONTROLLER ENABLE LEFT-HAND CONTROLLER | — | TRANSITION TO STATE 704 | TRANSITION TO STATE 703 | — |
| (STATE 702) ENABLE RIGHT-HAND CONTROLLER DISABLE LEFT-HAND CONTROLLER | TRANSITION TO STATE 703 | TRANSITION TO STATE 702 | — | TRANSITION TO STATE 704 |
| (STATE 703) DISABLE RIGHT-HAND CONTROLLER AND LEFT-HAND CONTROLLER | — | — | — | TRANSITION TO STATE 701 |
| (STATE 704) ENABLE RIGHT-HAND CONTROLLER AND LEFT-HAND CONTROLLER | TRANSITION TO STATE 701 | — | TRANSITION TO STATE 702 | — |

INFORMATION PROCESSING DEVICE AND CONTROL METHOD FOR TO REDUCING INCONVENIENCES WHEN A USER HOLDS A DISPLAY DEVICE

BACKGROUND

Field of the Invention

The present invention relates to a display device, an information processing device, and a control method.

Description of the Related Art

A virtual reality (VR) technique for presenting a virtual space to a user has recently been known. A mixed reality (MR) technique and an augmented reality (AR) technique for merging a real space and a virtual space and presenting a virtual reality space to a user have also been known. These techniques use a head-mounted display (HMD), a hand-held display (HHD), or the like in many cases to allow a user to experience a presented video image. In such technical fields, a technique for a user to perform various control operations on an HHD while holding the HHD has been studied.

In these virtual reality systems, use of a wearable controller to be worn on a user's hand or arm to convert a motion of the user's hand into a motion in a virtual space during control of an HMD or HHD has been studied. For example, Japanese Patent Application Laid-Open No. 2000-200133 discusses a conventional technique for controlling an HMD or HHD using a wearable controller to be worn on a user's hand or arm.

However, in the related art described above, when the user holds a display device, such as an HMD or HHD, with a user's hand wearing the controller, the user's motion of holding the display device can be erroneously recognized as an operation on the controller, which may lead to inconveniences such as occurrence of an unintended operation.

SUMMARY OF THE INVENTION

Accordingly, the present invention is directed to reducing inconveniences when a user holds a display device, such as an HMD or HHD, with a user's hand wearing a wearable controller. According to an aspect of the present invention, an information processing device connected to or integrated into a display device configured to receive an input via a controller includes a control unit configured to control, in a case where a user holds the display device with a user's hand wearing the controller, the display device not to receive the input via the controller, or not to execute any processing upon reception of the input via the controller.

Further features of the present invention will become apparent from the following description of exemplary embodiments with reference to the attached drawings.

DESCRIPTION OF THE EMBODIMENTS

Exemplary embodiments of the present invention will be described below with reference to the drawings. The same reference numerals are given to the same or similar components, members, and processes illustrated in the drawings, and redundant descriptions are omitted as necessary. The illustration of some of the components, members, and processes in the drawings is omitted.

Figure 1:
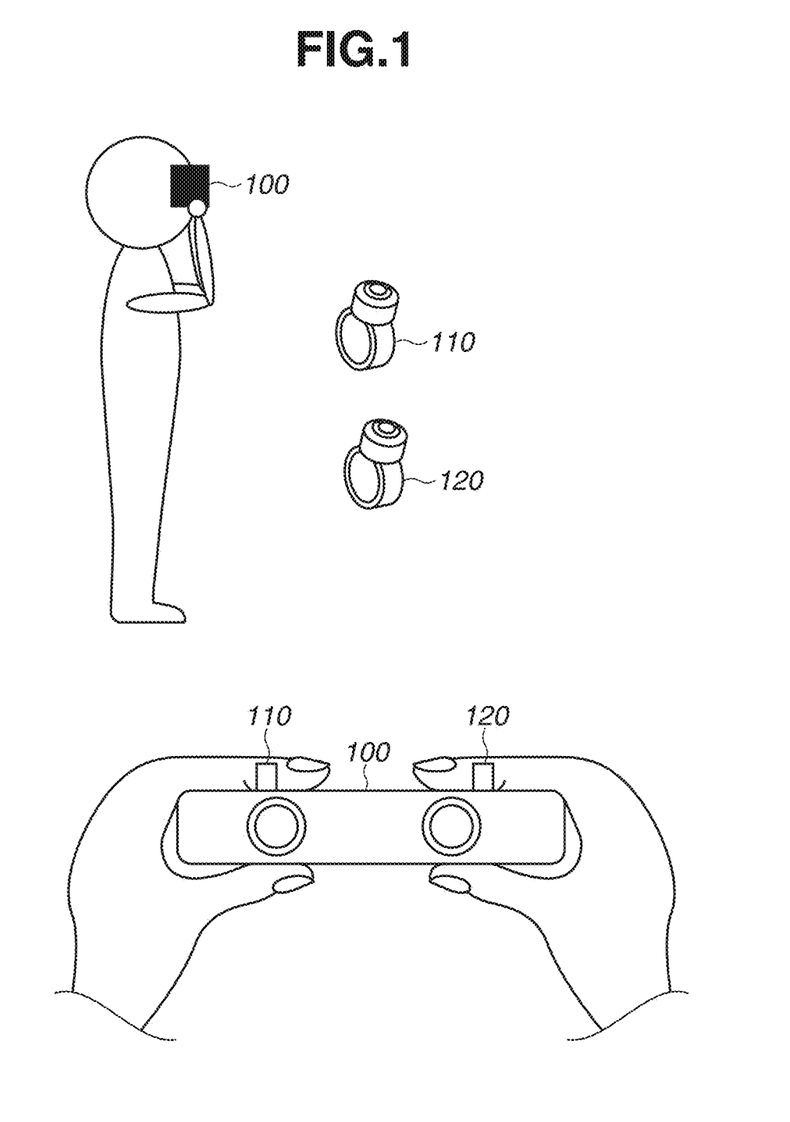
FIG. 1 is an explanatory diagram illustrating an information processing system according to one or more aspects of the present disclosure.

An example of a configuration of an information processing system according to a first exemplary embodiment will be described with reference to FIG. 1. The information processing system includes a hand-held display (HHD) 100, a controller 110, and a controller 120.

The HHD 100 is a hand-held type display device (electronic device) to be held by one or both of user's hands. The HHD 100 includes a small display unit (display unit). The HHD 100 displays a combined image obtained by combining a captured image obtained while the HHD 100 is capturing an image of a range in front of a user with content, such as computer graphics (CG), in a form depending on an orientation of the HHD 100.

The controller 110 and the controller 120 are devices for performing various control operations on the HHD 100. Each of the controller 110 and the controller 120 is a ring-shaped hand controller that can be worn on a user's finger as illustrated in FIG. 1. The controller 110 and the controller 120 perform wireless communication with the HHD 100 via Bluetooth®. Instead of establishing wireless communication via Bluetooth®, wireless communication via Wireless Fidelity (Wi-Fi®) or wired communication with a universal serial bus (USB) cable may be established.

In the first exemplary embodiment, the controller 110 and the controller 120 have a ring shape, but instead may have a bracelet shape, a glove shape, or the like.

In the first exemplary embodiment, the controller 110 and the controller 120 are worn on the user's hands, but instead one of the controller 110 and the controller 120 may be worn on one of the user's hands.

Further, the first exemplary embodiment is described assuming that the user wears the controller 110 on the user's right hand and wears the controller 120 on the user's left hand. However, the user may wear the controller 110 on the user's left hand and may wear the controller 120 on the user's right hand in an opposite manner.

In the first exemplary embodiment, furthermore, each of the controller 110 and the controller 120 can be worn on a user's finger, but instead may be worn on a predetermined part of the user's body. For example, like a watch type controller, each of the controller 110 and the controller 120 may be worn on a user's wrist, or like a glove type controller, each of the controller 110 and the controller 120 may be worn on a user's hand.

The information processing system according to the first exemplary embodiment includes the HHD 100, the controller 110, and the controller 120. The information processing system may have a configuration in which a personal computer (PC) is connected to the HHD 100 via wired communication or wireless communication and the PC performs processing to be performed by the HHD 100.

In the first exemplary embodiment, the HHD 100 is used. Instead of using the HHD 100, a head-mounted display (HMD) may be used.

<Internal Configuration of HHD>

Figure 2:
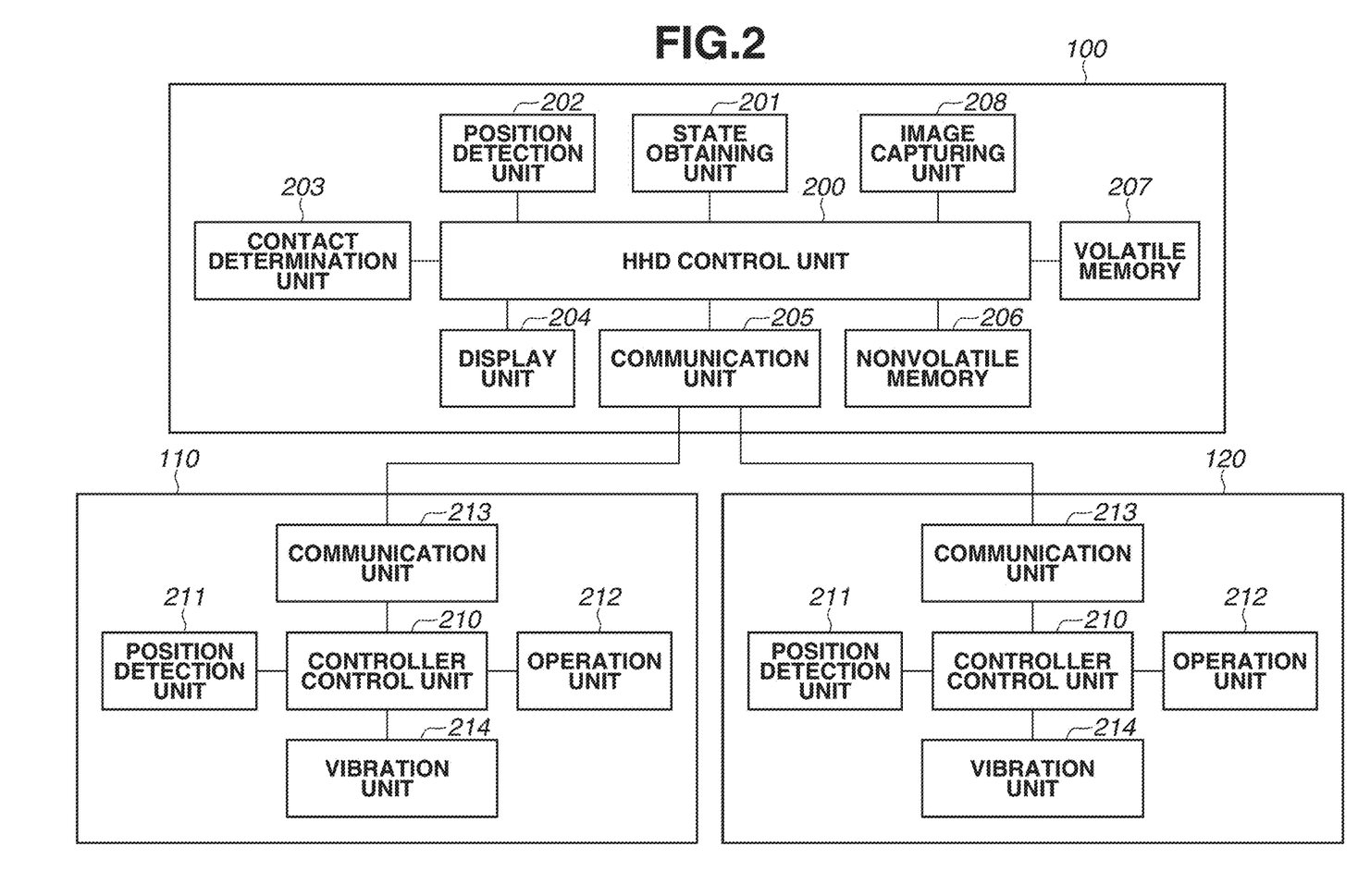
FIG. 2 is a block diagram illustrating an example of a functional configuration of each of a hand-held display (HHD) and controllers according to one or more aspects of the present disclosure.

An example of an internal configuration of the HHD 100 will be described with reference to FIG. 2. The HHD 100 includes an HHD control unit 200, a state obtaining unit 201, a position detection unit 202, a contact determination unit 203, a display unit 204, a communication unit 205, a nonvolatile memory 206, and a volatile memory 207.

The HHD control unit 200 is a central processing unit (CPU) for controlling each component of the HHD 100. The HHD control unit 200 obtains a state indicating whether the HHD 100 is in use from the state obtaining unit 201, positional information about the HHD 100 from the position detection unit 202, and information indicating which one of the user's hands is holding the HHD 100 from the contact determination unit 203. Further, the HHD control unit 200 determines whether to limit functions of the controller 110 and the controller 120 or to release the limitation on the functions based on a flowchart illustrated in FIG. 3 and a state transition table illustrated in FIG. 4. If the HHD control unit 200 determines to limit the functions, the HHD control unit 200 disables positional information about the controller 110 and the controller 120, information about an inertial sensor, and information about an Optical Track Pad (hereinafter referred to as "OTP"). These pieces of information are obtained via the communication unit 205. If the HHD control unit 200 determines to release the limitation on the functions, the HHD control unit 200 enables these pieces of information. The HHD control unit 200 displays the enabled state or the disabled state of each of the controller 110 and the controller 120 on the display unit 204.

Instead of controlling the entire device by the HHD control unit 200, processing to be performed by the HHD control unit 200 may be shared among a plurality of pieces of hardware to control the entire device.

The state obtaining unit 201 determines whether the HHD 100 is in use. The state obtaining unit 201 is, for example, an eye sensor, an infrared light-emitting diode (LED), a line-of-sight detection sensor, or a flip-up mechanism. In a state where the user is viewing a display through the HHD 100, the state obtaining unit 201 determines that the HHD 100 is in use. In a case where an eye sensor is used as the state obtaining unit 201, if the state obtaining unit 201 emits infrared light and receives reflected light, the HHD control unit 200 determines that the user is viewing a display through the HHD 100, i.e., that the HHD 100 is in use. In a case where an infrared LED is used as the state obtaining unit 201, the state obtaining unit 201 detects a pupil or cornea by a corneal reflection method. In the case where the state obtaining unit 201 detects a pupil or cornea, the HHD control unit 200 determines that the user is viewing a display through the HHD 100, i.e., that the HHD 100 is in use. In a case where a line-of-sight detection sensor is used as the state obtaining unit 201, a sensor using a visible camera can be used as the line-of-sight detection sensor. If the inner corner of an eye or an iris is detected by the visible camera, the HHD control unit 200 determines that the user is viewing a display through the HHD 100, i.e., that the HHD 100 is in use.

In a case where a flip-up mechanism is used as the state obtaining unit 201, a hand-held type display is assumed to be worn on the user's head. A head-mounted type display having a flip-up mechanism can also be used. In a state where the HHD 100 is flipped down, or in a state where the user can view a display through the display unit of the HHD 100, the HHD control unit 200 determines that the user is viewing a display through the HHD 100, i.e., that the HHD 100 is in use. In a state where the HHD 100 is flipped up, or in a state where the user cannot view a display through the display unit of the HHD 100, the HHD control unit 200 determines that the HHD 100 is not in use.

The position detection unit 202 detects the position of the HHD 100. The position detection unit 202 can use, for example, at least one of a geomagnetic sensor, a gyroscope sensor, an orientation sensor, and an altitude sensor, or a combination of these sensors.

To detect the position, a technique for detecting the position of the HHD 100 based on information obtained from an image capturing unit 208, such as simultaneous localization and mapping (SLAM), may be used in place of the position detection unit 202. In this case, the HHD control unit 200 obtains information not from the position detection unit 202 but from the image capturing unit 208, and performs control processing to estimate the position of the HHD 100 based on programs stored in the nonvolatile memory 206.

The contact determination unit 203 includes a right-hand contact sensor and a left-hand contact sensor, and identifies which one of the user's hands is holding the HHD 100, or whether user's both hands are holding the HHD 100 based on contact information obtained from the contact sensors. In the first exemplary embodiment, a contact sensor located on the right side, when the display unit through which the user views a display is in front of the user, is referred to as the right-hand contact sensor, and a contact sensor located on the left side, when the display unit through which the user views a display is in front of the user, is referred to as the left-hand contact sensor. Assume a case where the right-hand contact sensor and the left-hand contact sensor are located, for example, on a surface in contact with user's fingers holding the HHD 100 as illustrated in FIG. 1. Each contact sensor may be located on the surface of the HHD 100, except for the surface that may contact the user's face when the user views a display through the HHD 100. In this case, it may be determined that the user is holding the HHD 100 with the user's right hand based on contact information obtained from the right-hand contact sensor, and it may be determined that the user is holding the HHD 100 with the user's left hand based on contact information obtained from the left-hand contact sensor. As the contact determination unit 203, a capacitance sensor is assumed to be used to detect an actual contact. Alternatively, another type of sensor, such as an infrared sensor, for detecting blocking of infrared light instead of detecting an actual contact may be used.

The display unit 204 includes, for example, a liquid crystal panel or an organic electroluminescence (EL) panel. The display unit 204 informs the user of the enabled state or the disabled state of each of the controller 110 and the controller 120 determined by the HHD control unit 200.

The communication unit 205 performs wireless communication with each of the controller 110 and the controller 120 (communication unit 213).

The nonvolatile memory 206 is an electrically erasable or recordable nonvolatile memory, and stores programs and the like to be executed by the HHD control unit 200.

The volatile memory 207 is used as a buffer memory for temporarily holding image data captured by an image capturing unit 208, an image display memory for the display unit 204, a working area for the HHD control unit 200, or the like. The volatile memory 207 also stores the states of the controller 110 and the controller 120 determined based on, for example, the flowchart illustrated in FIG. 3.

The image capturing unit 208 includes two cameras (image capturing devices). The two cameras are located near user's right and left eye positions, respectively, when the user is holding the HHD 100, so that the cameras can capture video images and images of a space viewed by the user in a normal state. Images of an object (a range in front of the user) captured by the two cameras are output to the HHD control unit 200. The two cameras in the image capturing unit 208 are configured to obtain information about a distance from the two cameras to the object as distance information by ranging using a stereo camera. The image capturing unit 208 may capture a video image and output the captured video image.

<Internal Configuration of Each Controller>

An internal configuration example of each of the controller 110 and the controller 120 will be described with reference to FIG. 2. Assume that the controller 110 and the controller 120 have the same internal configuration. The controller 110 and the controller 120 may have respective different internal configurations, and may be connected to the HHD 100.

Each of the controller 110 and the controller 120 includes a controller control unit 210, a position detection unit 211, an operation unit 212, a communication unit 213, and a vibration unit 214.

The controller control unit 210 obtains positional information about the controller 110 and the controller 120 from the position detection unit 211 and operation information from the operation unit 212, and transmits the obtained information to the HHD 100 via the communication unit 213. The controller control unit 210 controls the vibration unit 214 to vibrate.

The position detection unit 211 detects the position of each of the controller 110 and the controller 120. The position detection unit 211 can use, for example, at least one of a geomagnetic sensor, a gyroscope sensor, an orientation sensor, and an altitude sensor, or a combination of these sensors.

To detect the position, a technique for detecting the position of the HHD 100 from information obtained from an image capturing unit, such as SLAM, may be used. In this case, each of the controller 110 and the controller 120 includes a nonvolatile memory (not illustrated). The controller control unit 210 controls each of the controller 110 and the controller 120 to estimate the position of the HHD 100 based on programs stored in the nonvolatile memory.

The operation unit 212 obtains information input from each device, and transmits output information. The operation unit 212 include, for example, an OTP, a button and a four-way operational key, and input information to be input using the OTP, the button or the four-way operational key is transmitted to the HHD 100 via the communication unit 213. The operation unit 212 may include a touch panel.

The communication unit 213 performs wireless communication with the HHD 100 (communication unit 205).

The vibration unit 214 receives a vibration request from the HHD control unit 200 or the controller control unit 210, and vibrates in response to the vibration request.

<Flow of Control Related to HHD Operation when Controllers are Worn on User's Both Hands>

Processing for determining whether to enable or disable the controller 110 and the controller 120 according to the first exemplary embodiment will be described with reference to the flowchart illustrated in FIG. 3. Assume that processing in this flowchart is periodically executed based on latest information.

In step S301, the HHD control unit 200 determines whether the HHD 100 is in use or not in use based on a detection result from the state obtaining unit 201. If the HHD control unit 200 determines that the HHD 100 is in use (YES in step S301), the processing proceeds to step S302. If the HHD control unit 200 determines that the HHD 100 is not in use (NO in step S301), the processing proceeds to step S306. In step S306, the HHD control unit 200 disables functions of the controller 110 and the controller 120.

In step S302, the HHD control unit 200 obtains information indicating whether the user is holding the HHD 100 with the user's right hand from the contact determination unit 203.

In step S303, the HHD control unit 200 obtains information indicating whether the user is holding the HHD 100 with the user's left hand from the contact determination unit 203.

In step S304, the HHD control unit 200 obtains positional information about the HHD 100 from the position detection unit 202 and obtains positional information about the controller 110 and the controller 120 via the communication unit 205. The HHD control unit 200 calculates a distance based on the positional information about the HHD 100 and each of the controller 110 and the controller 120. If the distance between the HHD 100 and each controller is less than a threshold, the HHD control unit 200 determines that the user is holding the HHD 100 with the user's hand wearing the controller. If the distance is not less than the threshold, the HHD control unit 200 determines that the user's hand wearing the controller is separated from the HHD 100, i.e., that the user is not holding the HHD 100 with the user's hand wearing the controller. If the distance is less than or equal to the threshold, the HHD control unit 200 may determine that the user is holding the HHD 100 with the user's hand wearing the HHD 100. The positional information about the HHD 100 and each of the controller 110 and the controller 120 may be calculated based on information detected by the above-described geomagnetic sensor, gyroscope sensor, orientation sensor, or altitude sensor. If information about an acceleration is detected by the above-described geomagnetic sensor, gyroscope sensor, orientation sensor, or altitude sensor, the positional information can be calculated by integrating the acceleration. If the position information is to be represented by three-dimensional coordinates, the distance may be calculated based on each component, or the distance may be simply obtained from any two components. The distance may be calculated based on a result of self-position estimation such as SLAM. Ranging via wireless communication may be used as a method for calculating the distance between each controller and the HHD 100. In this case, the HHD control unit 200 calculates the distance between each controller and the HHD 100 based on a reception intensity of radio wave via wireless communication. The distance may be calculated based on the fact that the reception intensity of radio wave via wireless communication is greater as the distance is shorter. For example, in a case where the reception intensity of radio wave exceeds a threshold, it may be determined that the distance between each controller and the HHD 100 is short. In a case where the reception intensity of radio wave is more than or equal to the threshold, it may be determined that the distance between each controller and the HHD 100 is short.

Figure 3:
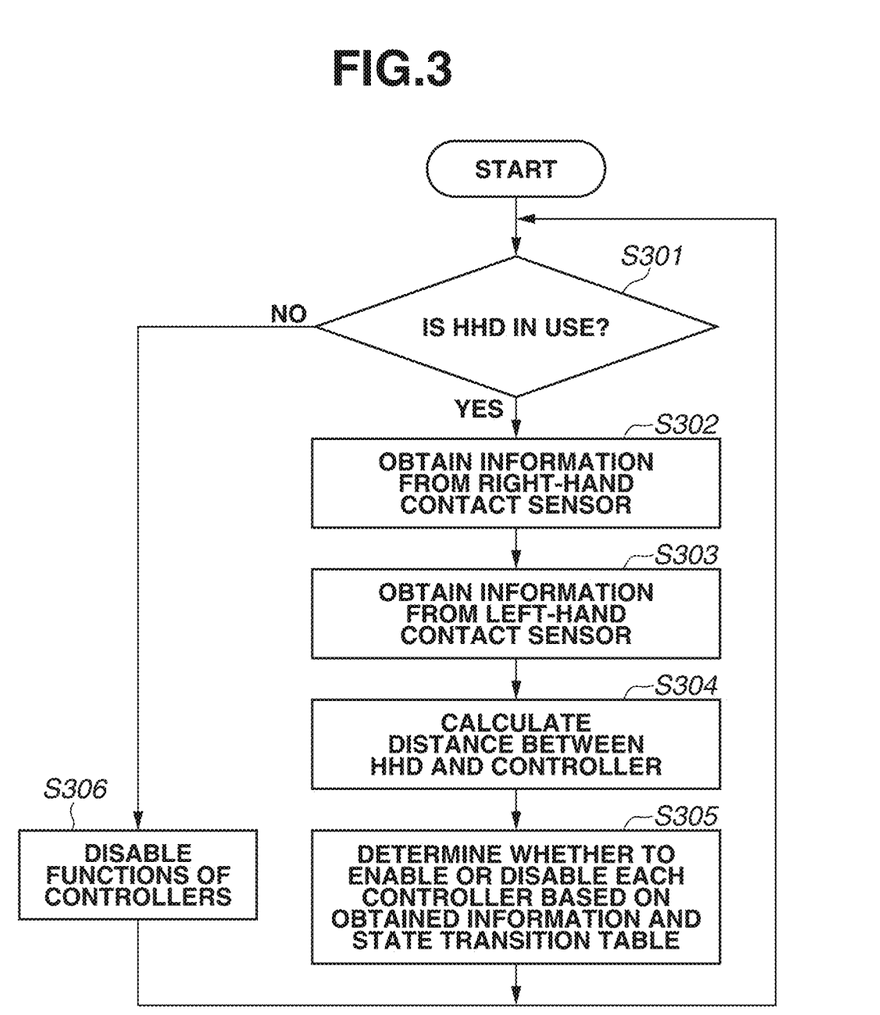
FIG. 3 is a flowchart illustrating an operation of each functional unit according to one or more aspects of the present disclosure.
Figure 4:
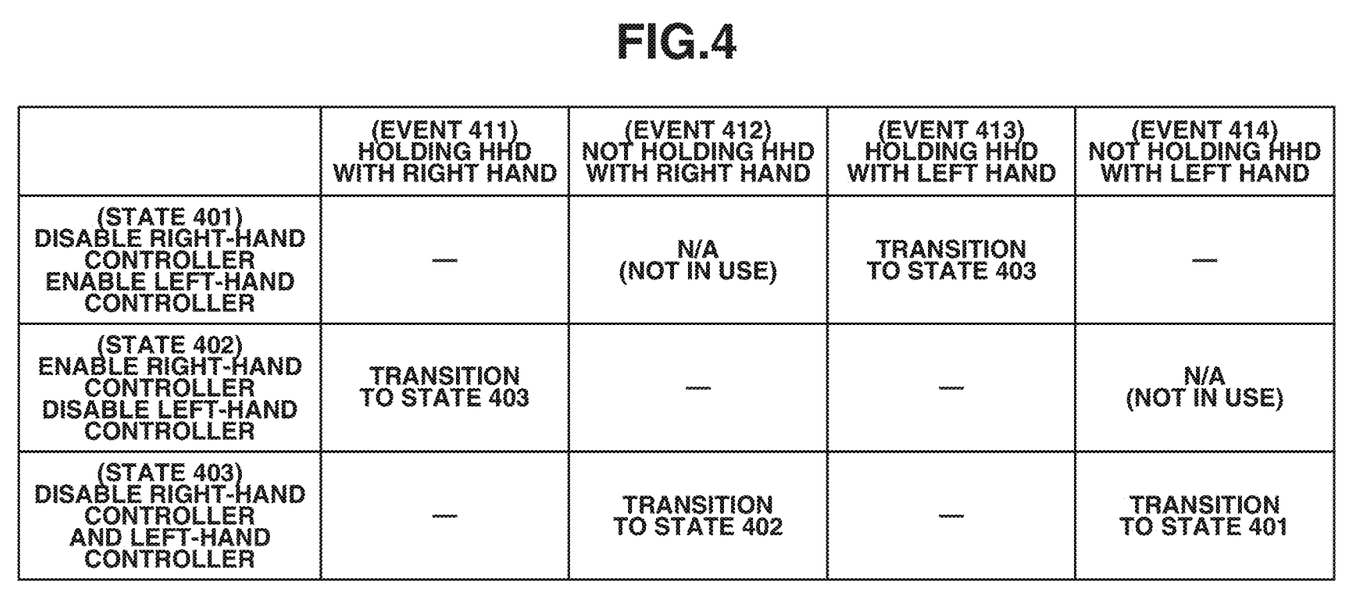
FIG. 4 is a state transition table according to the first exemplary embodiment.

In step S305, the HHD control unit 200 determines whether to enable or disable the controller 110 and the controller 120 based on the information obtained in steps S302, S303, and S304 and the state transition table illustrated in FIG. 4, and updates the volatile memory 207.

The HHD control unit 200 obtains information indicating whether the user is holding the HHD 100 with a user's hand from the contact determination unit 203 in steps S302 and S303 and also obtains the distance between the HHD 100 and each controller in step S304 according to the present exemplary embodiment. However, the order of these processes may be reversed. The HHD control unit 200 may perform the determination based on the state transition table by obtaining only information indicating whether the user is holding the HHD 100 with a user's hand from the contact determination unit 203 in steps S302 and S303, and step S304 may be omitted. The HHD control unit 200 may perform the determination based on the state transition table by obtaining only the distance between the HHD 100 and each controller in step S304, and steps S302 and S303 may be omitted.

<State Transition Table According to First Exemplary Embodiment>

A state transition of each of the controller 110 and the controller 120 according to the first exemplary embodiment will be described with reference to the state transition table illustrated in FIG. 4. The first exemplary embodiment is described assuming that the controller 110 is worn on the user's right hand and the controller 120 is worn on the user's left hand. In the first exemplary embodiment, it is determined that the HHD 100 is in use when the user is holding the HHD 100 with at least one of the user's hands. Accordingly, the first exemplary embodiment is described assuming that a state where both the right-hand controller and the left-hand controller are enabled does not occur. In a case where the controller 110 and the controller 120 are worn on user's both hands, respectively, if the user is holding the HHD 100 with one of the user's hands and is not holding the HHD 100 with the other hand, the controller worn on the user's hand holding the HHD 100 is disabled and the controller worn on the user's hand not holding the HHD 100 is enabled. If the user is holding the HHD 100 with both hands, both the right-hand controller and the left-hand controller are disabled. The state transition table illustrated in FIG. 4 starts from any one of a state 401, a state 402, and a state 403. If a predetermined event, which is one of an event 411, an event 412, an event 413, and an event 414, is detected, the HHD control unit 200 controls the state to transition to another state based on the state transition table. The determination based on the state transition table illustrated in FIG. 4 is performed assuming a case where the state is caused to transition to another state and a case where the HHD 100 is not in use. In the case where the HHD 100 is not in use, functions of the controller 110 and the controller 120 that are worn on the user's both hands are disabled.

The state 401 is a state where the HHD control unit 200 disables input information to be input from the operation unit 212 of the controller 110 worn on the user's right hand and output information to be output to the vibration unit 214 of the controller 110, and enables input information to be input to the operation unit 212 of the controller 120 worn on the user's left hand and output information to be output to the vibration unit 214 of the controller 120.

The state 402 is a state where the HHD control unit 200 enables input information to be input from the operation unit 212 of the controller 110 worn on the user's right hand and output information to be output to the vibration unit 214 of the controller 110, and disables input information to be input from the operation unit 212 of the controller 120 worn on the user's left hand and output information to be output to the vibration unit 214 of the controller 120.

The state 403 is a state where the HHD control unit 200 disables input information to be input from the operation unit 212 of the controller 110 worn on the user's right hand and output information to be output to the vibration unit 214 of the controller 110, and disables input information to be input from the operation unit 212 of the controller 120 worn on the user's left hand and output information to be output to the vibration unit 214 of the controller 120.

The event 411 is an event where the HHD control unit 200 determines that the user is holding the HHD 100 with the user's right hand based on contact information obtained from the contact determination unit 203.

The event 412 is an event where the HHD control unit 200 determines that the user is not holding the HHD 100 with the user's right hand based on contact information obtained from the contact determination unit 203.

The event 413 is an event where the HHD control unit 200 determines that the user is holding the HHD 100 with the user's left hand based on contact information obtained from the contact determination unit 203.

The event 414 is an event where the HHD control unit 200 determines that the user is not holding the HHD 100 with the user's left hand based on contact information obtained from the contact determination unit 203.

If the event 411 or the event 414 occurs in the state 401, the HHD control unit 200 does not execute any processing.

If the event 413 occurs in the state 401, the HHD control unit 200 disables the right-hand controller and the left-hand controller, and stores this state in the volatile memory 207. In other words, the HHD control unit 200 controls the state to transition from the state 401 to the state 403.

If the event 412 occurs in the state 401, the HHD control unit 200 disables functions of both the right-hand controller and the left-hand controller and terminates state transition control processing based on the state transition table.

If the event 411 occurs in the state 402, the HHD control unit 200 disables both the right-hand controller and the left-hand controller and stores this state in the volatile memory 207. In other words, the HHD control unit 200 controls the state to transition from the state 402 to the state 403.

If the event 412 or the event 413 occurs in the state 402, the HHD control unit 200 does not execute any processing.

If the event 414 occurs in the state 402, the HHD control unit 200 disables functions of both the right-hand controller and the left-hand controller and terminates state transition control processing based on the state transition table.

If the event 411 or the event 413 occurs in the state 403, the HHD control unit 200 does not execute any processing.

If the event 412 occurs in the state 403, the HHD control unit 200 enables the right-hand controller and stores this state in the volatile memory 207. In other words, the HHD control unit 200 controls the state to transition from the state 403 to the state 402.

If the event 414 occurs in the state 403, the HHD control unit 200 enables the left-hand controller and stores this state in the volatile memory 207. In other words, the HHD control unit 200 controls the state to transition from the state 403 to the state 401.

In addition, an event where user's both hands have simultaneously moved away or separated from the HHD 100 may be set as an event 415.

In this case, the event 415 indicates an event where the HHD control unit 200 determines that the user's both hands are separated from the HHD 100 based on contact information obtained from the contact determination unit 203. If the event 415 occurs in the state 401 or the state 402, the HHD control unit 200 does not execute any processing. If the event 415 occurs in the state 403, the HHD control unit 200 terminates state transition control processing based on the state transition table in a state where the functions of both the right-hand controller and the left-hand controller are disabled. Instead of setting the event 415, assuming that two events may occur, the state may transition from the state 402 to the state 401 and the event 412 may occur, and the state may transition from the state 401 to the state 402 and the event 414 may occur.

According to the exemplary embodiment described above, in a case where the HHD 100 and wearable controllers are used in combination, it is possible to provide a simple user interface that prevents a malfunction from occurring due to the wearable controllers worn on a user's hands holding the HHD 100.

The HHD control unit 200 determines whether to limit functions of the controller 110 and the controller 120, or to release the limitation on the functions based on the flowchart illustrated in FIG. 3 and the state transition table illustrated in FIG. 4. If the HHD control unit 200 determines to limit the functions, the HHD control unit 200 disables positional information about the controller 110 and the controller 120, information about the inertial sensor, and OTP information, which are obtained via the communication unit 205. In order to disable the information about each controller, the first exemplary embodiment assumes a case where the HHD control unit 200 performs control processing to prevent transmission of these pieces of information from each controller via the communication unit 213 and the communication unit 205, or the HHD control unit 200 performs control processing to prevent reception of these pieces of information even when these pieces of information are transmitted from each controller via the communication unit 213 and the communication unit 205. If the HHD control unit 200 determines to release the limitation on the functions, these pieces of information are enabled. The HHD control unit 200 displays the enabled state or the disabled state of each controller on the display unit 204. All the functions of the controller 110 and the controller 120 may be limited, or some of the functions may be limited. For example, only a vibration function of the vibration unit 214 may be configured to be not limited, or only the vibration function of the vibration unit 214 may be configured to be limited. The functions of the controller 110 and the controller 120 may be configured such that only functions designated by the user may not be limited, or only functions designated by the user may be limited. If the controller 110 and the controller 120 further include an LED as a light-emitting unit including a light-emitting function, the HHD control unit 200 may perform control processing to disable or enable output information to be output to the light-emitting unit. In the case of disabling output information to be output to each controller, the HHD control unit 200 may perform control processing to prevent transmission of an instruction to each controller via the communication unit 205 and the communication unit 213. In the case of disabling output information to be output to each controller, the HHD control unit 200 may control each controller not to output even when an instruction is transmitted to each controller from the HHD control unit 200.

The distance between each controller and the HHD 100 may be calculated based on a captured image obtained by the HHD control unit 200 from an image capturing device, such as a camera, as an external device via the communication unit 205. In this case, stereo matching by triangulation may be performed, and by simply detecting a state where a part of the controller is in contact with a part of the HHD 100 from the image, it may be determined that the distance between the controller and the HHD 100 is short.

An example where either the controller 110 or the controller 120 is worn on one of the user's hands will be described as a second exemplary embodiment with reference to FIG. 1. The information processing system (FIG. 1) and the functional configurations (FIG. 2) of the HHD 100 and each controller according to the second exemplary embodiment are similar to those of the first exemplary embodiment. Accordingly, only differences between the second exemplary embodiment and the first exemplary embodiment will be described.

While the second exemplary embodiment describes an example where the controller 110 is worn on the user's right hand, the controller 120 may also be used and worn on the user's left hand.

The second exemplary embodiment is described assuming that the controller 110 is worn on the user's right hand. Since it is determined that the HHD 100 is in use when the user is holding the HHD 100 with at least one of the user's hands in the second exemplary embodiment, assume a case where the user is holding the HHD 100 with the user's left hand and performs an operation using the controller 110 worn on the user's right hand.

<Flow of Control Related to HHD Operation when Controller is Worn on One of User's Hands>

Figure 5:
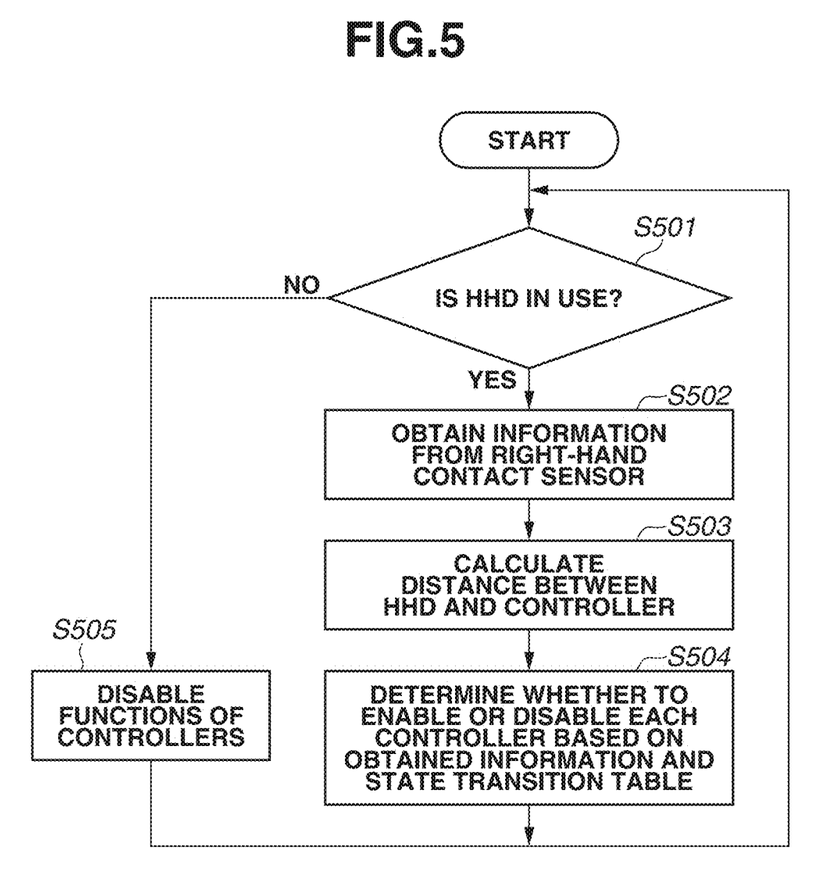
FIG. 5 is a flowchart illustrating an operation of each functional unit according to one or more aspects of the present disclosure.

Processing for determining whether to enable or disable functions of the controller 110 according to the second exemplary embodiment will be described with reference to a flowchart illustrated in FIG. 5. Assume that processing in this flowchart is periodically executed based on latest information.

In step S501, the HHD control unit 200 obtains information indicating whether the HHD 100 is in use or not in use from the state obtaining unit 201. If the HHD 100 is in use (YES in step S501), the processing proceeds to step S502. If the HHD 100 is not in use (NO in step S501), the processing proceeds to step S505. In step S505, the HHD control unit 200 disables functions of the controller 110 and the controller 120.

In step S502, the HHD control unit 200 obtains information indicating whether the user is holding the HHD 100 with the user's right hand from the contact determination unit 203.

In step S503, the HHD control unit 200 obtains positional information about the HHD 100 from the position detection unit 202 and also obtains positional information about the controller 110 via the communication unit 205. The HHD control unit 200 calculates the distance between the HHD 100 and the controller based on the positional information about the HHD 100 and the controller. If the distance between the HHD 100 and the controller is less than a threshold, the HHD control unit 200 determines that the user is holding the HHD 100 with the user's hand wearing the controller. If the distance is not less than the threshold, the HHD control unit 200 determines that the user's hand wearing the controller is separated from the HHD 100.

Figure 6:
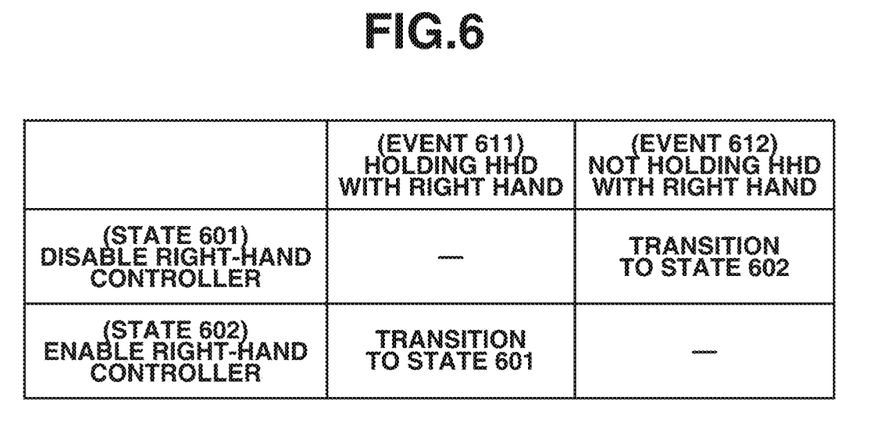
FIG. 6 is a state transition table according to one or more aspects of the present disclosure.

In step S504, the HHD control unit 200 determines whether to enable or disable the controller 110 based on the information obtained in steps S502 and S503 and a state transition table illustrated in FIG. 6, and updates the volatile memory 207.

In step S502, the HHD control unit 200 obtains information indicating whether the user is holding the HHD 100 with the user's right hand from the contact determination unit 203, and in step S503, the distance between the HHD 100 and the controller is obtained. However, the order of these processes may be reversed. The HHD control unit 200 may perform the determination based on the state transition table by obtaining only information indicating whether the user is holding the HHD 100 with the user's right hand from the contact determination unit 203 in step S502, and step S503 may be omitted. The HHD control unit 200 may perform the determination based on the state transition table by obtaining only the distance between the HHD 100 and the controller in step S503, and step S502 may be omitted.

<State Transition Table According to Second Exemplary Embodiment>

A state transition of the controller 110 according to the second exemplary embodiment will be described with reference to the state transition table illustrated in FIG. 6. The state transition table illustrated in FIG. 6 starts from one of a state 601 and a state 602. If a predetermined event, which is one of an event 611 and an event 612, is detected, the HHD control unit 200 controls the state to transition to another state based on the state transition table. The determination based on the state transition table illustrated in FIG. 6 is performed assuming that the user is holding the HHD 100 with the user's left hand. In the event 611, assume that the user is holding the HHD 100 not only with the left hand but also with the right hand, i.e., that the user is holding the HHD 100 with both hands. In the event 612, assume that the user's right hand holding the HHD 100 has stopped holding the HHD 100 from the state where the user is holding the HHD 100 with both hands, i.e., that the user is holding the HHD 100 with the user's left hand.

The state 601 is a state where the HHD control unit 200 disables input information to be input from the operation unit 212 of the controller 110 worn on the user's right hand and output information to be output to the vibration unit 214 of the controller 110.

The state 602 is a state where the HHD control unit 200 enables input information to be input from the operation unit 212 of the controller 110 worn on the user's right hand and output information to be output to the vibration unit 214 of the controller 110.

The event 611 is an event where the HHD control unit 200 determines that the user is holding the HHD 100 with the user's right hand based on contact information obtained from the contact determination unit 203.

The event 612 is an event where the HHD control unit 200 determines that the user is not holding the HHD 100 with the user's right hand based on contact information obtained from the contact determination unit 203.

If the event 611 occurs in the state 601, the HHD control unit 200 does not execute any processing.

If the event 612 occurs in the state 601, the HHD control unit 200 enables the right-hand controller and stores this state in the volatile memory 207. In other words, the HHD control unit 200 controls the state to transition from the state 601 to the state 602.

If the event 611 occurs in the state 602, the HHD control unit 200 disables the right-hand controller and stores this state in the volatile memory 207. In other words, the HHD control unit 200 controls the state to transition from the state 602 to the state 601.

If the event 612 occurs in the state 602, the HHD control unit 200 does not execute any processing.

According to the exemplary embodiment described above, in a case where the HHD 100 and a wearable controller are used in combination, it is possible to obtain the same advantageous effects even when the wearable controller is worn on one of the user's hands.

A third exemplary embodiment will be described with reference to FIGS. 1, 2 and 3, assuming that the controller 110 and the controller 120 are worn on use's hands and an HMD is used in place of the HHD 100. While the HHD 100 is a hand-held type display, the HMD is a head-mounted type display to be worn on the user's head. By wearing the HMD on the user's head, the user can use the HMD in the same manner as when the user views a display through the display unit while holding the HHD 100. Unlike in the case of holding the HHD 100, when the HMD is worn on the user's head, the user can freely use both hands. However, assume a case where the HMD worn on the user's head is displaced and the position of the HMD is adjusted while holding the HMD. In the third exemplary embodiment, the parts of the HHD 100 are respectively replaced by the corresponding parts of the HMD in FIGS. 1, 2, and 3. In the following description, an HMD control unit 200 is used in place of the HHD control unit 200.

<Flow of Control Related to HMD Operation when Controllers are Worn on User's Both Hands>

The third exemplary embodiment is described with reference to the flowchart illustrated in FIG. 3. According to the third exemplary embodiment, since the HMD can be used without holding the HMD with a user's hand or hands, assume that there is a state where both the right-hand controller and the left-hand controller are enabled, unlike in the first exemplary embodiment. In the flowchart illustrated in FIG. 3, it is determined whether to enable or disable the controller 110 and the controller 120 based on a state transition table illustrated in FIG. 7, and updates the volatile memory 207. <State Transition Table according to Third Exemplary Embodiment>

<State Transition Table According to Third Exemplary Embodiment>

Figure 7:
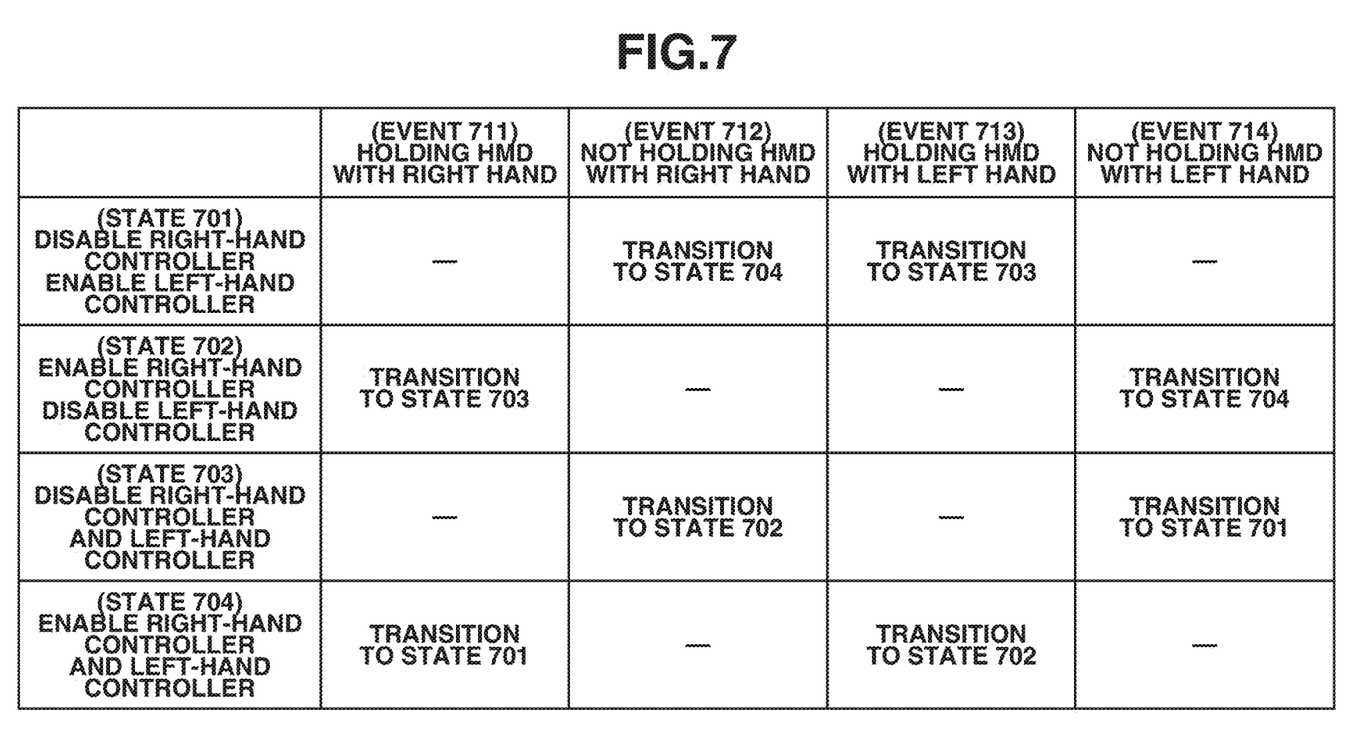
FIG. 7 is a state transition table according to one or more aspects of the present disclosure.

A state transition of each of the controller 110 and the controller 120 according to the third exemplary embodiment will be described with reference to the state transition table illustrated in FIG. 7. The third exemplary embodiment is described assuming that the controller 110 is worn on the user's right hand and the controller 120 is worn on the user's left hand. The state transition table illustrated in FIG. 7 starts from any one of a state 701, a state 702, a state 703, and a state 704. If a predetermined event, which is any one of an event 711, an event 712, an event 713, and an event 714, is detected, the HMD control unit 200 controls the state to transition to another state based on the state transition table. If user's both hands are separated from the HMD, i.e., user's both hands are not holding the HMD, the user can perform an operation using the controller 110 and the controller 120 that are worn on the user's both hands.

The state 701 is a state where the HMD control unit 200 disables input information to be input from the operation unit 212 of the controller 110 worn on the user's right hand and output information to be output to the vibration unit 214 of the controller 110, and enables input information to be input from the operation unit 212 of the controller 120 worn on the user's left hand and output information to be output to the vibration unit 214 of the controller 120.

The state 702 is a state where the HMD control unit 200 enables input information to be input from the operation unit 212 of the controller 110 worn on the user's right hand and output information to be output to the vibration unit 214 of the controller 110, and disables input information to be input from the operation unit 212 of the controller 120 worn on the user's left hand and output information to be output to the vibration unit 214 of the controller 120.

The state 703 is a state where the HMD control unit 200 disables input information to be input from the operation unit 212 of the controller 110 worn on the user's right hand and output information to be output to the vibration unit 214 of the controller 110, and disables input information to be input to the operation unit 212 of the controller 120 worn on the user's left hand and output information to be output to the vibration unit 214 of the controller 120.

The state 704 is a state where the HMD control unit 200 enables input information to be input from the operation unit 212 of the controller 110 worn on the user's right hand and output information to be output to the vibration unit 214 of the controller 110, and enables input information to be input from the operation unit 212 of the controller 120 worn on the user's left hand and output information to be output to the vibration unit 214 of the controller 120.

The event 711 is an event where the HMD control unit 200 determines that the user is holding the HMD 100 with the user's right hand based on contact information obtained from the contact determination unit 203.

The event 712 is an event where the HMD control unit 200 determines that the user's right hand is separated from the HMD 100, i.e., the user is not holding the HMD 100 with the user's right hand based on contact information obtained from the contact determination unit 203.

The event 713 is an event where the HMD control unit 200 determines that the user is holding the HMD 100 with the user's left hand based on contact information obtained from the contact determination unit 203.

The event 714 is an event where the HMD control unit 200 determines that the user's left hand is separated from the HMD 100, i.e., the user is not holding the HMD 100 with the user's left hand based on contact information obtained from the contact determination unit 203.

If the event 711 or the event 714 occurs in the state 701, the HMD control unit 200 does not execute any processing.

If the event 712 occurs in the state 701, the HMD control unit 200 enables functions of the right-hand controller and the left-hand controller and stores this state in the volatile memory 207. In other words, the HMD control unit 200 controls the state to transition from the state 701 to the state 704.

If the event 713 occurs in the state 701, the HMD control unit 200 disables the right-hand controller and the left-hand controller and stores this state in the volatile memory 207. In other words, the HMD control unit 200 controls the state to transition from the state 701 to the state 703.

If the event 711 occurs in the state 702, the HMD control unit 200 disables the right-hand controller and the left-hand controller and stores this state in the volatile memory 207. In other words, the HMD control unit 200 controls the state to transition from the state 702 to the state 703.

If the event 712 or the event 713 occurs in the state 702, the HMD control unit 200 does not execute any processing.

If the event 714 occurs in the state 702, the HMD control unit 200 enables functions of the right-hand controller and the left-hand controller and stores this state in the volatile memory 207. In other words, the HMD control unit 200 controls the state to transition from the state 702 to the state 704.

If the event 711 or the event 713 occurs in the state 703, the HMD control unit 200 does not execute any processing.

If the event 712 occurs in the state 703, the HMD control unit 200 enables the right-hand controller and stores this state in the volatile memory 207. In other words, the HMD control unit 200 controls the state to transition from the state 703 to the state 702.

If the event 714 occurs in the state 703, the HMD control unit 200 enables the left-hand controller and stores this state in the volatile memory 207. In other words, the HMD control unit 200 controls the state to transition from the state 703 to the state 701.

If the event 711 occurs in the state 704, the HMD control unit 200 disables the right-hand controller and stores this state in the volatile memory 207. In other words, the HMD control unit 200 controls the state to transition from the state 704 to the state 701.

If the event 712 or the event 714 occurs in the state 704, the HMD control unit 200 does not execute any processing.

If the event 713 occurs in the state 704, the HMD control unit 200 disables the left-hand controller and stores this state in the volatile memory 207. In other words, the HMD control unit 200 controls the state to transition from the state 704 to the state 702.

According to the exemplary embodiment described above, in a case where the HMD and wearable controllers are used in combination, it is possible to provide a simple user interface that prevents a malfunction from occurring due to the wearable controllers worn on a user's hands holding the HMD.

A fourth exemplary embodiment will be described with reference to FIGS. 1, 2, 5, and 6, assuming that the controller 110 is worn on the user's right hand and an HMD is used in place of the HHD 100. Also, assume that the controller 120 is not worn on a user's hand. The controller 120 may be, however, worn on the user's left hand. While the HHD is a hand-held type display, the HMD is a head-mounted type display to be worn on the user's head. By wearing the HMD on the user's head, the use can use the HMD in the same manner as when the user views a display through the display unit while holding the HHD 100. Unlike in the case of holding the HHD 100, when the HMD is worn on the user's head, the user can freely use both hands. However, assume a case where the HMD worn on the user's head is displaced and the position of the HMD is adjusted while holding the HMD. In the fourth exemplary embodiment, the parts of the HHD 100 are respectively replaced by the corresponding parts of the HMD in FIGS. 1, 2, and 3. In the following description, the HMD control unit 200 is used in place of the HHD control unit 200.

<Flow of Control Related to HMD Operation when Controller is Worn on One of User's Hands>

The fourth exemplary embodiment is described with reference to the flowchart illustrated in FIG. 5. In the fourth exemplary embodiment, the HMD can be used without holding the HMD with the user's right hand. In the flowchart illustrated in FIG. 5, it is determined whether to enable or disable functions of the controller 110 and the controller 120 based on the state transition table illustrated in FIG. 6, and the volatile memory 207 is updated.

<State Transition Table According to Fourth Exemplary Embodiment>

The fourth exemplary embodiment is described with reference to the state transition table illustrated in FIG. 6. The state transition table illustrated in FIG. 6 starts from one of the state 601 and the state 602. If the predetermined event, which is one of the event 611 and the event 612, is detected, the HMD control unit 200 controls the state to transition to another state based on the state transition table. In the fourth exemplary embodiment, the determination based on state transition table illustrated in FIG. 6 is performed assuming not only a case where the user's left hand is holding the HMD 100, but also a case where the user's both hands are not holding the HMD 100. Since no controller is worn on the user's left hand in the fourth exemplary embodiment, whether the user is holding the HMD 100 with the user's left hand is not considered. Accordingly, in the event 611, assume that the user is holding the HMD 100 with the user's right hand, and whether the user is holding the HMD 100 with the user's left hand is not considered. In other words, the fourth exemplary embodiment assumes a case where the user is holding the HMD 100 with the user's right hand from the state where the user is not holding HMD 100, or assumes a case where the user is holding the HMD 100 with both hands from the state where the user is holding the HMD 100 with the user's left hand. In the event 612, assume that the user has stopped holding the HMD 100 with the user's right hand from the state where the user is holding the HMD with both hands, or that the user has stopped holding the HMD 100 from the state where the user is holding the HMD 100 with the user's right hand.

The state 601 is a state where the HMD control unit 200 disables input information to be input from the operation unit 212 of the controller 110 worn on the user's right hand and output information to be output to the vibration unit 214 of the controller 110.

The state 602 is a state where the HMD control unit 200 enables input information to be input from the operation unit 212 of the controller 110 worn on the user's right hand and output information to be output to the vibration unit 214 of the controller 110.

The event 611 is an event where the HMD control unit 200 determines that the user is holding the HMD 100 with the user's right hand based on contact information obtained from the contact determination unit 203.

The event 612 is an event where the HMD control unit 200 determines that the user is not holding the HMD 100 with the user's right hand based on contact information obtained from the contact determination unit 203.

If the event 611 occurs in the state 601, the HMD control unit 200 does not execute any processing.

If the event 612 occurs in the state 601, the HMD control unit 200 disables the right-hand controller and stores this state in the volatile memory 207. In other words, the HMD control unit 200 controls the state to transition from the state 601 to the state 602. If the event 611 occurs in the state 602, the HMD control unit 200 enables the right-hand controller and stores this state in the volatile memory 207. In other words, the HMD control unit 200 controls the state to transition from the state 602 to the state 601.

If the event 612 occurs in the state 602, the HMD control unit 200 does not execute any processing.

According to the exemplary embodiment described above, in a case where the HMD and a wearable controller are used in combination, it is possible to obtain the same advantageous effects even when the wearable controller is worn on only one of the user's hands.

Other Exemplary Embodiments

The present invention can also be implemented by executing the following processing. That is, software (program) for implementing the functions according to the exemplary embodiments described above is supplied to a system or a device via a network or various storage media, and a computer (or a control unit, a micro processing unit (MPU), etc.) in the system or the device reads out and executes a program code. In this case, the program and storage media storing the program are included in the present invention.

While the present invention has been described in detail above based on preferred exemplary embodiments, the present invention is not limited to these specific exemplary embodiment. Various modes within the gist of the invention are also included in the present invention. Some of the exemplary embodiments described above may be combined as appropriate.

Each functional unit in the exemplary embodiments (modified examples) described above may or may not be an individual piece of hardware. In other words, each functional unit may be a communication system configured by an individual piece of hardware. Functions of two or more functional units may be implemented by common hardware. Each of functions of a single functional unit may be implemented by an individual piece of hardware. Two or more functions of a single functional unit may be implemented by common hardware. Alternatively, each functional unit may or may not be implemented by hardware such as an application-specific integrated circuit (ASIC), a field-programmable gate array (FPGA), or a digital signal processor (DSP). For example, the device may include a processor and a memory (storage medium) storing control programs. Functions of at least some of functional units included in the device may be implemented by the processor reading out control programs from the memory and executing the control programs.

The present invention can also be implemented by the following processing. That is, a program for implementing one or more functions according to the exemplary embodiments described above is supplied to a system or a device via a network or a storage medium, and one or more processors in a computer of the system or the device read out and execute the program. The present invention can also be implemented by a circuit (e.g., ASIC) for implementing one or more functions according to the exemplary embodiments described above. Other Embodiments Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

[Configuration 1]

A display device configured to receive an input via a controller, the control device including a control unit configured to control, in a case where a user holds the display device with a user's hand wearing the controller, the display device not to receive the input via the controller, or not to execute any processing upon reception of the input via the controller.

[Configuration 2]

The display device according to configuration 1, further including a first obtaining unit configured to obtain first information indicating a distance between the display device and the controller, in which, in a case where the user holds the display device with a user's hand, the control unit controls, based on the first information, the display device not to receive the input via the controller worn on the user's hand holding the display device, or not to execute any processing upon reception of the input via the controller worn on the user's hand holding the display device.

[Configuration 3]

The display device according to configuration 1 or 2, in which, in a case where user's hands each wear the controller and one of the user's hands holds the display device, the control unit controls the display device to receive the input via the controller worn on the user's hand not holding the display device.

[Configuration 4]

The display device according to configuration 1 or 2, in which, in a case where one of user's hands wears the controller and the user holds the display device with a user's hand not wearing the controller, the control unit controls the display device to receive the input via the controller worn on the user's hand not holding the display device.

[Configuration 5]

The display device according to any one of configurations 1 to 4, in which the display device is configured to be held by a user's hand or hands, and in which, in a case where the user is not holding the display device with one or both of user's hands, the control unit controls the display device not to receive the input via the controller, or not to execute any processing upon reception of the input via the controller worn on the user's hand holding the display device.

[Configuration 6]

The display device according to any one of configurations 1 to 4, in which the display device is configured to be worn on a user's head, and in which, in a case where the user is not holding the display device with one or both of user's hands, the control unit controls the display device to receive the input via the controller.

[Configuration 7]

The display device according to any one of configurations 1 to 6, further comprising a detection unit configured to detect that a predetermined part of the user contacts the display device.

[Configuration 8]

The display device according to configuration 7, in which the detection unit is one of an infrared sensor and a capacitance sensor.

[Configuration 9]

The display device according to any one of configurations 2 to 8, further including a second obtaining unit configured to obtain second information indicating a position of the display device, and a third obtaining unit configured to obtain third information indicating a position of the controller, in which the first obtaining unit obtains the first information based on the second information and the third information.

[Configuration 10]

The display device according to any one of configurations 2 to 9, in which, in a case where the first information indicating the distance is less than a first threshold, the control unit controls the display device not to receive the input via the controller worn on the user's hand holding the display device, or controls the display device not to execute any processing upon reception of the input via the controller worn on the user's hand holding the display device.

[Configuration 11]

The display device according to any one of configurations 2 to 8, further including a communication unit configured to perform wireless communication with the controller, in which the first obtaining unit obtains the first information indicating the distance based on a reception intensity of radio wave via the communication unit.

[Configuration 12]

The display device according to configuration 11, in which, in a case where the reception intensity of the radio wave via the communication unit exceeds a second threshold, the control unit controls the display device not to receive the input via the controller worn on the user's hand holding the display device, or controls the display device not to execute any processing upon reception of the input via the controller worn on the user's hand holding the display device.

[Configuration 13]

The display device according to any one of configurations 1 to 12, in which the controller includes a button, and in which the control unit controls the display device not to receive an input from the button, or controls the display device not to execute any processing upon reception of the input from the button of the controller.

[Configuration 14]

The display device according to any one configurations 1 to 13, further including an obtaining unit configured to obtain information indicating at least one of a position and an orientation of the controller, in which the control unit controls the display device not to receive an input based on the information indicating the at least one of the position and the orientation of the controller, or controls the display device not to execute any processing upon reception of the input based on the information indicating the at least one of the position and the orientation of the controller.

[Configuration 15]

The display device according to any one of configurations 1 to 14, in which the display device receives an input via a ring-shaped controller worn on a user's finger.

[Configuration 16]

A display device configured to receive an input via a controller, the display device including a control unit configured to control, in a case where a user holds the display device with a user's hand wearing the controller, the display device to disable a predetermined function of the controller worn on the user's hand holding the display device, or not to transmit an instruction to execute the predetermined function to the controller worn on the user's hand holding the display device.

[Configuration 17]

The display device according to configuration 16, in which the predetermined function of the controller is one of a vibration function and a light-emitting function.

[Configuration 18]

An information processing device configured to receive an input via a controller, the information processing device including a control unit configured to control, in a case where a user holds an external device with a user's hand wearing the controller, the information processing device not to receive the input via the controller worn on the user's hand holding the external device, or not to execute any processing upon reception of the input via the controller worn on the user's hand holding the display device.

[System]

A system including a controller and a display device configured to receive an input via the controller, in which the display device includes a control unit configured to control, in a case where a user holds the display device with a user's hand wearing the controller, the display device not to receive the input via the controller worn on the user's hand holding the display device, or not to execute any processing upon reception of the input via the controller worn on the user's hand holding the display device.

[Storage Medium]

A computer-readable storage medium storing a program for causing a computer to execute each unit of the display device according to any one of configurations 1 to 17.

[Method]

A control method for a display device configured to receive an input via a controller, the control method including controlling, in a case where a user holds the display device with a user's hand wearing the controller, the display device not to receive the input via the controller worn on the user's hand holding the display device, or not to execute any processing upon reception of the input via the controller worn on the user's hand holding the display device.

[System]

A system including a controller and a display device configured to receive an input via the controller,
in which the display device includes a control unit configured to control, in a case where a user holds the display device with a user's hand wearing the controller, the display device to disable a predetermined function of the controller worn on the user's hand holding the display device, or not to transmit an instruction to cause the controller worn on the user's hand holding the display device to execute the predetermined function.

[Method]

A control method for a display device configured to receive an input via a controller, the control method including performing control, in a case where a user holds the display device with a user's hand wearing the controller, to disable a predetermined function of the controller worn on the user's hand holding the display device, or not to transmit an instruction to cause the controller worn on the user's hand holding the display device to execute the predetermined function.

[System]

A system including a controller, an information processing device configured to receive an input via the controller, and an external device, in which the information processing device includes a control unit configured to perform control, in a case where a user holds the external device with a user's hand wearing the controller, not to receive the input via the controller worn on the user's hand holding the external device, or not to execute any processing upon reception of the input via the controller worn on the user's hand holding the display device.

[Storage Medium]

A computer-readable storage medium storing a program for causing a computer to execute each unit of the information processing device according to configuration 18.

[Method]

A control method for an information processing device configured to receive an input via a controller, the control method including performing control, in a case where a user holds an external device with a user's hand wearing the controller, not to receive the input via the controller worn on the user's hand holding the external device, or not to execute any processing upon reception of the input via the controller worn on the user's hand holding the display device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-088523, filed May 30, 2023, which is hereby incorporated by reference herein in its entirety.

What is claimed is:

1. An information processing device connected to or integrated into a display device configured to receive an input via a controller, the information processing device comprising:
    a processor; and
    a memory storing instructions which, when executed by the processor, cause the information processing device to:
    execute control processing for performing control, in a case where a user holds the display device with a user's hand wearing the controller, the display device not to receive the input via the controller, or not to execute any processing upon reception of the input via the controller;
    execute first obtaining processing for obtaining first information indicating a distance between the display device and the controller,
    wherein in the control processing, in a case where the user holds the display device with a user's hand, based on the first information, the display device is controlled not to receive the input via the controller worn on the user's hand holding the display device, or not to execute any processing upon reception of the input via the controller worn on the user's hand holding the display device.

2. The information processing device according to claim 1, wherein
    the instructions, when executed by the processor, further cause the information processing device to
    execute second obtaining processing for obtaining second information indicating a position of the display device; and
    execute third obtaining processing for obtaining third information indicating a position of the controller,
    wherein in the first obtaining processing, the first information is obtained based on the second information and the third information.

3. The information processing device according to claim 2, wherein in the control processing, in a case where the first information indicating the distance is less than a first threshold, the display device is controlled not to receive the input via the controller worn on the user's hand holding the display device, or not to execute any processing upon reception of the input via the controller worn on the user's hand holding the display device.

4. The information processing device according to claim 1, wherein
the instructions, when executed by the processor, further cause the information processing device to execute communication processing for performing wireless communication with the controller,
wherein in the first obtaining processing, the first information indicating the distance is obtained based on a reception intensity of radio wave in the communication processing.

5. The information processing device according to claim 4, wherein in the control processing, in a case where the reception intensity of the radio wave in the communication processing exceeds a second threshold, the display device is controlled not to receive the input via the controller worn on the user's hand holding the display device, or not to execute any processing upon reception of the input via the controller worn on the user's hand holding the display device.

6. The information processing device according to claim 1, wherein in the control processing, in a case where user's hands each wear the controller and one of the user's hands holds the display device, the display device is controlled to receive the input via the controller worn on the user's hand not holding the display device.

7. The information processing device according to claim 1, wherein in the control processing, in a case where one of user's hands wears the controller and the user holds the display device with a user's hand not wearing the controller, the display device is controlled to receive the input via the controller worn on the user's hand not holding the display device.

8. The information processing device according to claim 1,
wherein the display device is configured to be held by a user's hand or hands, and
wherein in the control processing, in a case where the user is not holding the display device with user's hands, the display device is controlled not to receive the input via the controller, or not to execute any processing upon reception of the input via the controller worn on the user's hand holding the display device.

9. The information processing device according to claim 1,
wherein the display device is configured to be worn on a user's head, and
wherein in the control processing, in a case where the user is not holding the display device with user's hands, the display device is controlled to receive the input via the controller.

10. The information processing device according to claim 1, wherein the instructions, when executed by the processor, further cause the information processing device to execute detection processing for detecting that a predetermined part of the user contacts the display device.

11. The information processing device according to claim 10, display device is based on one of an infrared sensor and a capacitance sensor.

12. The information processing device according to claim 1,
wherein the controller includes a button, and
wherein in the control processing the display device is controlled not to receive an input from the button, or not to execute any processing upon reception of the input from the button of the controller.

13. The information processing device according to claim 1, wherein
the instructions, when executed by the processor, further cause the information processing device to execute fourth obtaining processing for obtaining information indicating at least one of a position and an orientation of the controller,
wherein in the control processing the display device is controlled not to receive an input based on the information indicating the at least one of the position and the orientation of the controller, or not to execute any processing upon reception of the input based on the information indicating the at least one of the position and the orientation of the controller.

14. The information processing device according to claim 1, wherein the display device receives an input via a ring-shaped controller worn on a user's finger.

15. A control method of an information processing device connected to or integrated into a display device configured to receive an input via a controller, the control method comprising:
performing control, in a case where a user holds the display device with a user's hand wearing the controller, the display device not to receive the input via the controller, or not to execute any processing upon reception of the input via the controller;
obtaining first information indicating a distance between the display device and the controller,
wherein the control is performed so that, in a case where the user holds the display device with a user's hand, based on the first information, the display device is controlled not to receive the input via the controller worn on the user's hand holding the display device, or not to execute any processing upon reception of the input via the controller worn on the user's hand holding the display device.

16. A non-transitory computer-readable storage medium which stores a program for causing a computer to execute a control method of an information processing device, the method comprising:
performing control, in a case where a user holds the display device with a user's hand wearing the controller, the display device not to receive the input via the controller, or not to execute any processing upon reception of the input via the controller;
obtaining first information indicating a distance between the display device and the controller,
wherein the control is performed so that, in a case where the user holds the display device with a user's hand, based on the first information, the display device is controlled not to receive the input via the controller worn on the user's hand holding the display device, or not to execute any processing upon reception of the input via the controller worn on the user's hand holding the display device.

* * * * *